United States Patent Office 3,324,058
Patented June 6, 1967

3,324,058
METHOD FOR PRODUCING ORGANO-
POLYSILOXANES
Richard C. Scott, Waterford, N.Y., assignor to General
Electric Company, a corporation of New York
No Drawing. Filed July 6, 1965, Ser. No. 469,837
5 Claims. (Cl. 260—18)

This docket relates to a method for producing organopolysiloxanes. More particularly, it relates to a method for blending the catalyst of a room temperature vulcanizing organopolysiloxane rubber with a silanol-terminated organopolysiloxane, through the use of a copolymer containing organopolysiloxane members and polyoxyalkylene members. This copolymer is miscible with the silanol-terminated organopolysiloxane and the catalyst is miscible in the copolymer.

The formulation and curing of two-part room temperature vulcanizing organopolysiloxane rubbers have been described in the prior art, for example, U.S. Patent 2,843,555, Berridge, and U.S. Patent 3,127,363, Nitzsche et al. In each of these patents, the compositions comprise a silanol-terminated organopolysiloxane, an organic silicate or the partial hydrolysis product of an organic silicate, and a metal salt of a carboxylic acid. The curing is accomplished through the interaction of the silanol-terminated organopolysiloxane with the organic silicate and metal salt. The metal salt must be blended with the organopolysiloxane at the point of use since an intimate mixture of the three components described above begins to cure, almost immediately. The metthods now employed for this blending include direct mixing of the solid or liquid metallic salt with the organopolysiloxane. However, due to the relatively small amounts of the metal salt which are included with the organopolysiloxane, assurance of intimate mixing is difficult. Another method involves the use of an organic solvent solution of the metal salt for blending with the silanol-terminated organopolysiloxane. This, however, results in the handling of a component which must be removed, with the attendant problems of flammability and toxicity, or which remains in the room temperature vulcanized rubber to adversely affect the properties of that material.

In many of the applications in which room temperature vulcanizing organopolysiloxane rubbers are now employed, automatic mixing equipment would be desirable. Such equipment could be used with the organic solvent solution of the metal salt, but as previously pointed out the solvent solutions raise certain problems. If the metal salt, alone, is used, the quantities and ratios are so small as to not allow the proper functioning of the automatic mixing equipment. Thus, in uses such as the production line encapsulation of electronic circuit components or in the coating of roof structures with room temperature vulcanizing organopolysiloxane rubbers, manual mixing has remained the most used method.

The metal salts which are employed as catalysts in room temperature vulcanizing organopolysiloxanes are immiscible with the stadard polydimethylsiloxane fluids. It has, therefore, been impossible to use this material as a diluent for the metal salt prior to blending. A material compatible with the other components of the room temperature vulcanizing composition which does not adversely affect its properties is necessary from the standpoint of metal salt dilution.

In accordance with the present invention it has unexpectedly been discovered that a copolymer of an organopolysiloxane and a polyether, such as those employed as surfactants in the manufacture of urethane foams, can be used to dilute the metal salts without adversely affecting the final organopolysiloxane rubber. Further, the use of these organopolysiloxane-polyether copolymers provides additional advantages. The viscosity of the room temperature vulcanizing composition, including the metal salt catalyst contained in the copolymer, is reduced prior to cure, thus allowing better flow in the automatic mixing equipment and onto the materials to be coated with the composition. Because the second part of the two-part room temperature vulcanizing composition is much larger in amount, for example 100 parts of the silanol-terminated organopolysiloxane to 10 parts of the diluted catalyst mixture, compared with 100 parts of the silanol-terminated organopolysiloxane to 0.5 part of the catalyst, alone, efficient use of automatic mixing equipment is possible. The particular copolymer is miscible with water and, thus, moisture can be incorporated in the room temperature vulcanizing organopolysiloxane composition when the catalyst is added, so that cure timing can be better regulated than when atmospheric moisture must be depended upon. Additionally, as previously described, the problems of incorporating an organic solvent are removed.

The type of linear, fluid organopolysiloxane, convertible to the cured, solid, elastic state, which is used in accordance with the present invention is critical and must have end groups composed of silicon-bonded hydroxyl groups. To produce these organopolysiloxanes the most suitable starting materials have been found to be those cyclic organopolysiloxanes of the general formula:

(1)  (R′R″SiO)$_n$ where R′ and R″ are organic radicals selected from the class consisting of alkyl radicals, e.g., methyl, ethyl, propyl, butyl, hexyl, etc.; aryl radicals, e.g., phenyl, diphenyl, naphthyl, etc.; alkaryl radicals, e.g., tolyl, xylyl, ethylphenyl, etc.; aralkyl radicals, e.g, benzyl, phenethyl, etc.; haloaryl radicals, e.g., chlorophenyl, tetrachlorophenyl, dichlorophenyl, etc.; and alkenyl radicals, e.g., vinyl, allyl, etc., which are advantageously present in amounts less than 5 to 10% of the total number of silicon-bonded organic radicals in the starting material; and $n$ is an integer equal to at least 3, e.g. from about 3 to 10, or more, depending upon the organic group in the starting organopolysiloxane.

The silanol-terminated organopolysiloxanes are generally linear fluid methyl polysiloxanes containing terminal silicon-bonded hydroxy groups and having an average of about 2 methyl groups per silicon atom. These materials are well known in the art and can be prepared, for example, by starting with cyclic dimethylpolysiloxanes having the formula:

(2)  [(CH$_3$)$_2$SiO]$_n$ where $n$ is as previously defined. Among the preferred cyclic dimethylpolysiloxanes employed as starting materials can be mentioned, for example, hexamethylcyclotrisiloxane, octamethylcyclotetrasiloxane, and decamethylcyclopentasiloxane, as well as mixtures of these three cyclic dimethylpolysiloxanes, alone, or with higher cyclopolysiloxanes.

In preparing the linear, fluid dimethylpolysiloxane containing terminal silicon-bonded hydroxy groups, the starting cyclic dimethylpolysiloxanes are advantageously heated at temperatures of from about 125° to 150° C. with small amounts of a siloxane rearrangement and condensation catalyst (about 0.001 to 0.01%, by weight, based on the weight of the cyclic organopolysiloxane), such as potassium hydroxide, tetrabutylphosphonium hydroxide, etc. The temperature and time at which this heating takes place will vary depending upon such factors as the particular cyclic dimethylpolysiloxane employed, the siloxane rearrangement and condensation catalyst employed, the concentration of catalyst, the desired viscosity, etc. In general, the polymerization is carried out for a time sufficient to obtain a high molecular weight product of about 150,000 to 2,000,000 centipoises viscosity, when measured at 25° C. Generally, this product is obtained in a time which varies from a few minutes to 4 to 6 or more hours, depending upon the reactants and the reaction conditions.

The high molecular weight product thus obtained is then treated with water to reduce its viscosity to about 1,000 to 100,000 centipoises at 25° C. This can be accomplished by blowing steam across the surface of the high molecular weight product for a sufficient time to give the lower viscosity material having terminal silicon-bonded hydroxy groups. Instead of blowing steam across the surface of the high molecular weight product, the steam may also be forced through the product. The resulting linear fluid organopolysiloxane containing terminal silicon-bonded hydroxy groups will have the general formula:

(3)

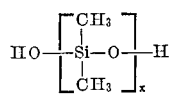

where $x$ is a whole number greater than 1, e.g., from 2 to 100 or more. Such compositions and methods for preparing the same are more particularly described in U.S. Patent 2,607,792, Warrick. The use of steam in this fashion causes a decrease in the viscosity of the high molecular weight product, at the same time forming linear polysiloxanes having the terminal silicon-bonded hydroxy groups.

An alternative method for making the linear fluid dimethylpolysiloxanes containing terminal silicon-bonded hydroxy groups comprises adding water to the high molecular weight polymers described above in such amounts that when heated at elevated temperatures, for instance from about 150° to 170° C., the viscosity is reduced to the desired level of 1,000 to 100,000 centipoises. The amount of water used will vary depending upon such factors as the molecular weight of the polymer being treated, the time and temperature at which the polymer being treated will be heated, the ultimate viscosity desired, etc. The amount of water used to reduce the molecular weight can be readily determined. For example, a linear fluid dimethylpolysiloxane containing terminal silicon-bonded hydroxyl groups and having a viscosity of from 1,000 to 2,000 centipoises can be obtained by heating a high molecular weight dimethylpolysiloxane prepared in accordance with the directions above, of about 2,000,000 centipoises viscosity, with 0.5%, by weight, of water for about 2 hrs. at 150° to 170° C.

While the polydimethylsiloxane having silanol chain terminals is generally preferred, up to about 50% of the polysiloxane can be formed with siloxy units containing the other organic radicals mentioned above. For example, a mixture of octamethylcyclotetrasiloxane and a cyclic polymer of ethylmethylsiloxane having the formula:

(4) $[(CH_3)(C_2H_5)SiO]_n$ where $n$ is as previously defined, can be employed. Additionally, mixtures of cyclic polymer of polydimethylsiloxane with cyclic polymers of polydiphenylsiloxane, polymethylphenylsiloxanes, etc., are useful as starting materials for the preparation of silanol-terminated organopolysiloxane for use in accordance with this invention.

The organosilicates which are used in the practice of the present invention are also well known in the art and are selected from the class consisting of (a) monomeric organosilicates corresponding to the general formula:

(5)

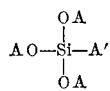

and (b) liquid partial hydrolysis products of the aforementioned monomeric organosilicates where A is a member selected from the class consisting of alkyl radicals and halogenated alkyl radicals, and A' is a member selected from the class consisting of alkyl radicals, aryl radicals, aralkyl radicals, alkaryl radicals, alkoxy radicals, aryloxy radicals, and halogenated derivatives of the aforementioned alkyl, aryl, aralkyl, alkaryl, alkoxy, and aryloxy radicals.

Included among the radicals which A and A' represent in Formula 5 are, for example, methyl, ethyl, propyl, isopropyl, butyl, amyl, isoamyl, octyl, isooctyl, decyl, dodecyl, β-chloroethyl, etc. Additional radicals which are represented by A' are, for example, ethoxy, propoxy, butoxy, nonoxy, phenyl, tolyl, xylyl, benzyl, phenethyl, naphthyl, anthracyl, biphenyl, phenoxy, p-bromophenoxy, β-chloroethoxy etc. The halogens, for example, chlorine, bromine, etc., can be attached to any position in the alkyl group or the aryl group and can comprise any number of halogens. When a halogen is attached to an alkyl group, in either the A or A' radical, it is preferred that it can be attached to a carbon atom other than the α-carbon atom in order to attain improved stability of such halogen-substituted alkyl groups.

Illustrative of the monomeric alkyl silicates which are preferred are those of the general formula:

(6) $(AO)_4Si$ where A is an alkyl group as defined above. In addition to employing the liquid monomeric organic silicates described above in the practice of the present invention, liquid partially hydrolyzed products derived from these monomeric silicates can also be employed, as mentioned above. Such hydrolysis products are generally obtained by effecting partial hydrolysis in water in the presence of small amounts of acid to a point where the monomeric organosilicate is still water soluble and where it is still possible to isolate a liquid, partially hydrolyzed organosilicon compound. A specific example is the controlled partial hydrolysis of ethyl orthosilicate. This hydrolysis can be carried out by adding acids or acid-forming metal salts to the liquid monomeric orthosilicate, for instance, ferric chloride, cupric chloride, aluminum chloride, stannic chloride, etc., and thereafter effecting suitable hydrolysis of this mixture of ingredients in water to obtain the two-phase composition from which the water soluble, partially hydrolyzed alkyl silicate can be readily separated from the aqueous phase and catalyst.

With respect to the metal salts of organic carboxylic acids, only certain metals are satisfactory for room temperature curing characteristics, as described in the aforementioned Berridge patent. The metals from which the salts are derived are selected from the class consisting of lead, tin, zirconium, antimony, iron, cadmium, barium, calcium, titanium, bismuth and manganese. Suitable acid radicals are those yielding the resinate, linoleate, stearate, oleate, or lower acid radicals, such as those yielding the acetate, the butyrate, the octoate, etc. Examples of operable salts include, for example, tin naphthenate, lead octoate, stannous octoate, iron stearate, tin oleate, antimony octoate, tin butyrate, dibutyl tin dilaurate, etc.

A wide variety of organopolysiloxane-polyoxyalkylene copolymers can be employed to dilute the metallic carboxylic acid catalyst. Among the copolymers which can be utilized in accordance with the present invention are those having the formula:

(7) $Z'_{(4-w)}(SiO_w)(D'ZSiO)_y(SiZ_2)_e$
$D[C_aH_{2a}O]_bZ''_cZ'''_{w-c}$ where D is a member selected from the class consisting of:

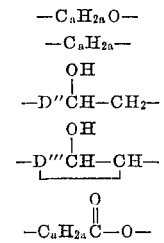

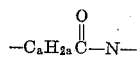

where D″ is a divalent hydrocarbon radical or a substituted divalent hydrocarbon radical, and D‴ is a trivalent hydrocarbon radical or substituted hydrocarbon radical; Z is selected from the class consisting of hydrogen, hydrocarbon radicals, hydrocarbonoxy radicals, halohydrocarbon radicals, halohydrocarbonoxy radicals, fluorinated hydrocarbon radicals, and hydrocarbon radicals substituted with a —CN group; D′ is the same as Z or is a group having the structure:

$$-(Z_2SiO)_d(C_aH_{2a}O)_bZ'''$$

Z′ is selected from the class consisting of hydrocarbon radicals and hydrocarbonoxy radicals; Z″ is a monovalent radical selected from the class consisting of carbamidoalkyl, sulfonamidoalkyl, hydrocarbon, hydrocarbonoxy, and halohydrocarbon; Z‴ is selected from the class consisting of hydrocarbon radicals, triorganosilyl radicals, and groups having the formula:

$$-(Z_2SiO)_ySiZ_3$$

$a$ is an integral number from 2 to 4, inclusive, $b$ is greater than 1, $c$ is from 1 to $w$, is at least 2, $e$ is 0 or 1, $w$ is an integral number of from 1 to 3, inclusive, and $y$ is at least as great as $w$. Compositions within the scope of Formula 7 are more particularly described in the following patents: U.S. Patent 2,834,748, Bailey et al., U.S. Patent 2,846,458, Haluska, U.S. Patent 2,917,480, Bailey et al., U.S. Patent 3,057,901, Plueddemann, U.S. Patent 3,172,899, Bailey, French Patent 1,364,214, British Patent 978,284, Bailey Patent 981,811, and British Patent 981,812, the disclosures of each of these being incorporated herein by reference. Specific examples of material of Formula 7 are shown, for instance, in Example 5 of U.S. Patent 3,182,076, Holdstock:

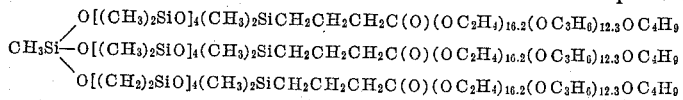

and in British Patent 981,814:

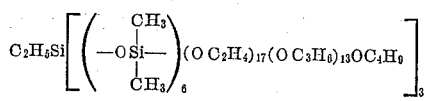

The metal salts of carboxylic acids, previously described, are soluble in the polysiloxane-polyoxyalkylene copolymers of Formula 7 and, additionally, the copolymers are compatible with the silanol-terminated organopolysiloxanes of Formula 3.

In accordance with the present invention, the metal carboxylic acid salt should be contained in a polysiloxane-polyoxyalkylene copolymer of Formula 7 in an amount of about 1 part of the salt in from 5 to 20 parts of the polysiloxane-polyoxyalkylene copolymer. This provides a sufficiently large quantity of catalyst-containing material to allow adequate blending with the silanol-terminated organopolysiloxane in, for example, automatic mixing equipment, while not incorporating too great a proportion of the copolymer so as to interfere with the advantageous properties of the room temperature vulcanized organopolysiloxane rubber.

The proportions of the other components of the room temperature vulcanizing composition can also be varied within very wide limits. For best results, however, the organosilicate or partial hydrolysis product, thereof, should be present in an amount, by weight, of from 0.1 to 5%, or more, based on the weight of the silanol-terminated organopolysiloxane material and the metal salt of the organocarboxylic acid should be present in an amount, by weight, of from 0.1 to 5%, based on the weight of the silanol-terminated organopolysiloxane. Preferably, there should be from 0.1 to 3 parts, by weight, of the metallic salt to each part of the organosilicate or partial hydrolysis product of the organosilicate.

Various fillers can also be incorporated in the room temperature vulcanizing composition. Among these fillers are, for example, titanium dioxide, lithopone, zinc oxide, zirconium silicate, silica aerogel, iron oxide, diatomaceous earth, calcium carbonate, fumed silica, precipitated silica, glass fibers, etc. The amount of filler can vary within wide limits, for example, from about 10 to 300 parts of filler, by weight, per 100 parts of the silanol-terminated organopolysiloxane. Preferably, the filler is present in an amount of from about 20 to 100 parts, per 100 parts of the silanol-terminated organopolysiloxane.

The organosilicate or partial hydrolysis product of the organosilicate and the filler, just described, can be mixed with either the silanol-terminated organopolysiloxane or with the polysiloxane-polyoxyalkylene copolymer containing the metal salt prior to the blending of these two components. If it is desired, a portion of the silicate can be contained in the copolymer and a portion in the silanol-terminated organopolysiloxane and the filler can likewise be split between these two components.

The utilization of the polysiloxane-polyoxyalkylene copolymer in diluting the catalyst of a room temperature vulcanizing polysiloxane rubber will now be described in greater detail. These examples should be considered as illustrative only and not as limiting in any way the full scope of this invention as covered in the appended claims. All parts in the following examples are by weight.

*Example 1*

A solution was prepared containing 450 parts of the polysiloxane-polyoxyalkylene copolymer shown in Example 5 of U.S. Patent 3,182,076, Holdstock, and 50 parts of dibutyl tin dilaurate. This was blended with a high speed mixer for about 15 minutes to assure uniformity.

A room temperature vulcanizing composition was prepared using 125 parts of a material of Formula 3 having a viscosity of about 4,000 centipoises at 25° C. and a hydroxyl content of about 0.1%, three parts of ethyl silicate, 50 parts of calcium carbonate, and 10 parts of zinc oxide. To this composition was added 10 parts of the catalyst prepared as above. A similar composition was prepared, but without diluting the metal carboxylate catalyst. The formulation containing the polysiloxane-polyoxyalkylene copolymer showed a pot life of 1.5 hours and a tack-free time of 2.5 hours while the room temperature vulcanizing composition made without the copolymer showed a pot life of 2 hours and a tack-free time of 3.5 hours. When tested for hardness, each of the compositions, after 24 hours, had a Shore A value of 40, but the material cured without the extra copolymer was still sticky, while the material made with the diluted catalyst showed no tackiness at all.

*Example 2*

Another room temperature vulcanizing composition was prepared using 110 parts of the silanol-terminated polymer described in Example 1, 55 parts of iron oxide, 20 parts of diatomaceous earth, 2.5 parts of ethyl silicate, and 10 parts of a catalyst solution containing 8 parts of the organopolysiloxane-polyoxyalkylene copolymer described in Example I(a) of the aforementioned Bailey et al. Patent 2,834,748, and 2 parts of stannous octoate. A second composition was prepared with the same formulation except that the stannous octoate was added undiluted. Each of the compositions was mixed for two minutes and tested for pot life and tack-free time. The composition made with the diluted catalyst had a pot life of 2.25 hours and a tack-free time of 4.5 hours, while the material made without the diluted catalyst showed a pot life of two hours and a tack-free time of 4 hours.

Example 3

A catalyst solution was prepared using 225 parts of the polysiloxane-polyoxyalkylene copolymer described in Example 1, 12.5 parts of dibutyl tin dilaurate, and 12.5 parts of spring water, to show the feasibility of adding water with the catalyst material.

A room temperature vulcanizing composition was prepared using approximately 110 parts of the silanol-terminated organopolysiloxane described in Example 1, 60 parts of iron oxide, 20 parts of diatomaceous earth, 3 parts of ethyl silicate, and 20 parts of the catalyst solution just described. A similar composition was prepared with 0.5 part of undiluted dibutyl tin dilaurate in place of the catalyst solution. Each of these was mixed for two minutes and tested for pot life and tack-free time. The room temperature vulcanizing composition employing the diluted catalyst showed a pot life of about 40 minutes and a tack-free time of 1.5 hours compared to a pot life of 3.5 hours and a tack-free time of 4.5 hours for the material made using the undiluted catalyst. After aging each of the rubbers prepared in this example for 4 hours, the material made utilizing the diluted catalyst showed a Shore A hardness of 50 while the material using the undiluted catalyst showed a Shore A hardness of 30. These tests indicate that the water contained in the catalyst increased the reactivity of the material markedly, providing a faster cure.

In accordance while the illustrations shown above it can clearly be seen that a method has been provided for blending the catalyst of a room temperature vulcanizing organopolysiloxane rubber with the silanol-terminated organopolysiloxane in a manner which provides greater assurance of adequate mixing without impairing the properties of the finally cured composition. While specific embodiments of the invention have been shown and described, the invention should not be considered as limited to the specific materials shown. The process of the present invention is broadly applicable to diluting the catalyst of a room temperature vulcanizing organopolysiloxane rubber in a polysiloxane-polyoxyalkylene copolymer prior to blending with the silanol-terminated organopolysiloxane material.

What I claim as new and desire to secure by Letters Patent of the United States:

1. A method for blending the components of a room temperature vulcanizing organopolysiloxane composition containing (1) a silanol-terminated organopolysiloxane having the formula:

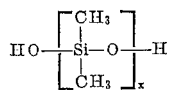

where $x$ is a whole number greater than 1, (2) a metal salt of an organic carboxylic acid in which the metal from which the salt is derived is selected from the class consisting of lead, tin, zirconium, antimony, iron, cadmium, barium, calcium, titanium, bismuth and manganese, and (3) an organosilicate selected from the class consisting of monomeric ogranosilicates corresponding to the formula:

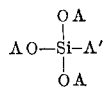

and liquid partial hydrolysis products of said monomeric organosilicates, where A is a member selected from the class consisting of alkyl radicals and halogenated alkyl radicals, and A' is a member selected from the class consisting of alkyl radicals, aryl radicals, aralkyl radicals, alkaryl radicals, alkoxy radicals, araloxy radicals, and halogenated derivatives of the aforementioned alkyl, aryl, aralkyl, alkaryl, alkoxy, and araloxy radicals, which method comprises:

(A) forming a solution of said metal salt of the organic carboxylic acid in an organopolysiloxane-polyoxyalkylene copolymer, and (B) mixing the solution of (A) with said silano-terminated organopolysiloxane, where said organopolysiloxane-polyoxyalkylene copolymer is employed in an amount equal to from 5 to 20 parts by weight per part of said metal salt of the organic carboxylic acid, and where said organopolysiloxane-polyoxyalkylene copolymer has the formula:

$$Z'_{(4-w)}(SiO_w)(D'ZSiO)_y(SiZ_2)_eD[(C_aH_{2a}O)_bZ'']_cZ'''_{w-c}$$

where D is a member selected from the class consisting of

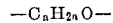

and

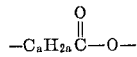

Z is selected from the class consisting of hydrogen, hydrocarbon radicals, and hydrocarbonoxy radicals; D' is the same as Z or is a group having the structure:

Z' is a member selected from the class consisting of hydrocarbon radicals and hydrocarbonoxy radicals; Z'' is a member selected from the class consisting of hydrocarbon and hydrocarbonoxy radicals; Z''' is a member selected from the class consisting of hydrocarbon radicals, triorganosilyl radicals and groups having the formula:

$$-(Z_2SiO)_ySiZ_3$$

$a$ is an integral number from 2 to 4, inclusive; $b$ is greater than 1, $c$ is from 1 to $w$, $d$ is at least equal to 2, $e$ is 0 or 1, $w$ is an integral number of from 1 to 3, inclusive, and $y$ is at least as great as $w$.

2. The method of claim 1 wherein said organosilicate is blended with said organopolysiloxane-polyoxyalkylene copolymer prior to mixing with said silanol-terminated organopolysiloxane.

3. The method of claim 1 wherein said organosilicate is blended with said silanol-terminated organopolysiloxane prior to mixing with the solution of said metal salt of the organic carboxylic acid in said organopolysiloxane-polyoxyalkylene copolymer.

4. The method of claim 1 wherein a portion of said organosilicate is blended with said organopolysiloxane-polyoxyalkylene copolymer and the remainder is blended with said silanol-terminated organopolysiloxane prior to mixing the solution of said metal salt of the organic carboxylic acid in said organopolysiloxane-polyoxyalkylene copolymer with said silanol-terminated organopolysiloxane.

5. The method of claim 1 wherein a small quantity of water is included in the blend of said metal salt of the organic carboxylic acid in said organopolysiloxane-polyoxyalkylene copolymer prior to mixing with said silanol-terminated organopolysiloxane.

References Cited

UNITED STATES PATENTS

| | | | |
|---|---|---|---|
| 3,111,535 | 11/1963 | Nitzsche et al. | 260—448.8 |
| 3,127,363 | 3/1964 | Nitzsche et al. | 260—18 |
| 3,161,614 | 12/1964 | Brown et al. | 260—46.5 |
| 3,170,894 | 2/1965 | Brown et al. | 260—448.8 |
| 3,172,899 | 3/1965 | Bailey | 260—46.5 |

DONALD E. CZAJA, *Primary Examiner.*

LEON J. BERCOVITZ, M. I. MARQUIS,
*Assistant Examiners.*